J. C. MILLER.
ICE CREAM FREEZER.
APPLICATION FILED OCT. 4, 1904.

945,570.

Patented Jan. 4, 1910.
4 SHEETS—SHEET 2.

WITNESSES:

INVENTOR

BY

ATTORNEY

J. C. MILLER.
ICE CREAM FREEZER.
APPLICATION FILED OCT. 4, 1904.
945,570.
Patented Jan. 4, 1910.
4 SHEETS—SHEET 3.
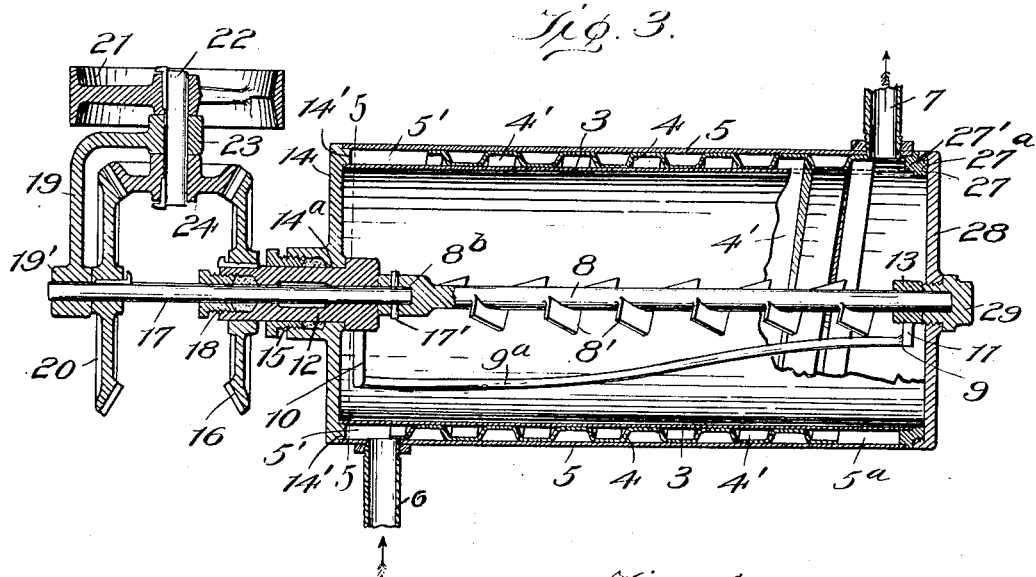
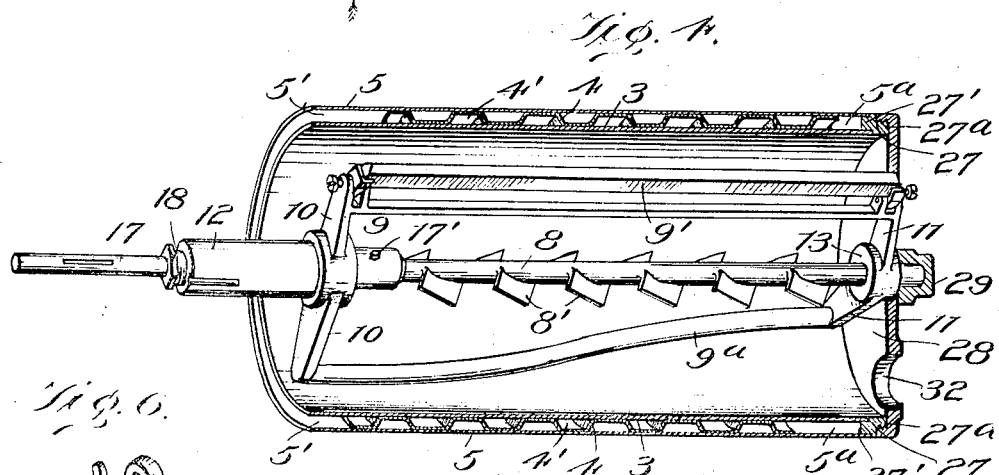
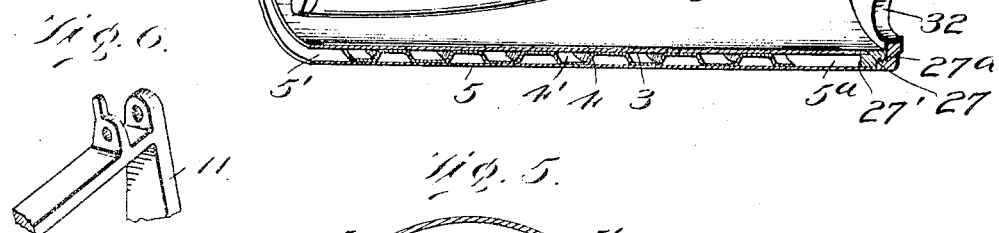
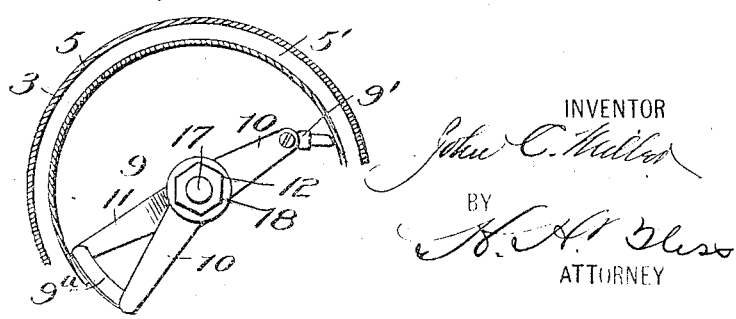
WITNESSES:
INVENTOR
John C. Miller
BY
H. H. Bliss
ATTORNEY

J. C. MILLER.
ICE CREAM FREEZER.
APPLICATION FILED OCT. 4, 1904.

945,570.

Patented Jan. 4, 1910.
4 SHEETS—SHEET 4.

WITNESSES:

INVENTOR
John C. Miller
BY
ATTORNEY

UNITED STATES PATENT OFFICE.

JOHN C. MILLER, OF CANTON, OHIO, ASSIGNOR TO THE MILLER PASTEURIZING MACHINE COMPANY, OF CANTON, OHIO, A CORPORATION OF NEW JERSEY.

ICE-CREAM FREEZER.

945,570.	Specification of Letters Patent.	Patented Jan. 4, 1910.

Application filed October 4, 1904. Serial No. 227,148.

*To all whom it may concern:*

Be it known that I, JOHN C. MILLER, a citizen of the United States, residing at Canton, in the county of Stark and State of Ohio, have invented certain new and useful Improvements in Ice-Cream Freezers, of which the following is a specification, reference being had therein to the accompanying drawing.

This invention relates to improvements in ice cream freezers, particularly of the type in which the freezing cylinder is arranged horizontally and is adapted to receive the mixture to be frozen and the agitating means within it is adapted both to stir or agitate the mixture and to feed it from the cylinder.

Figure 1:
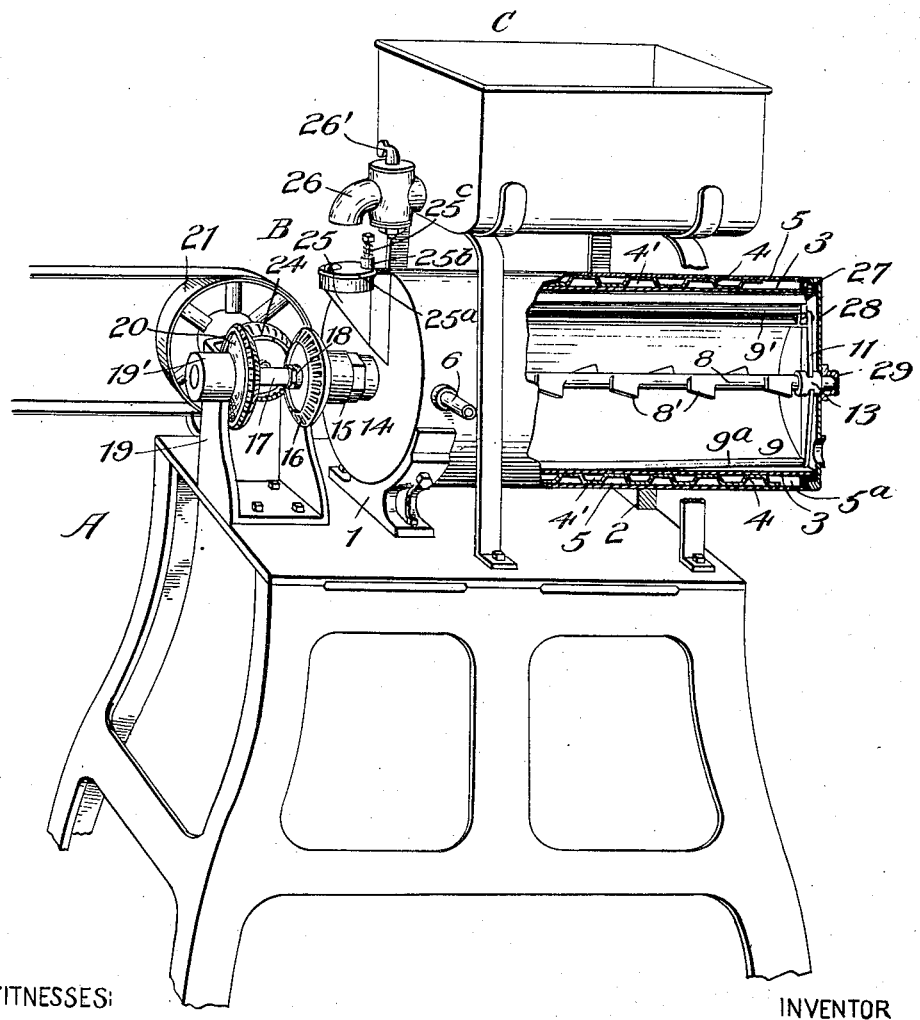
Figure 2:
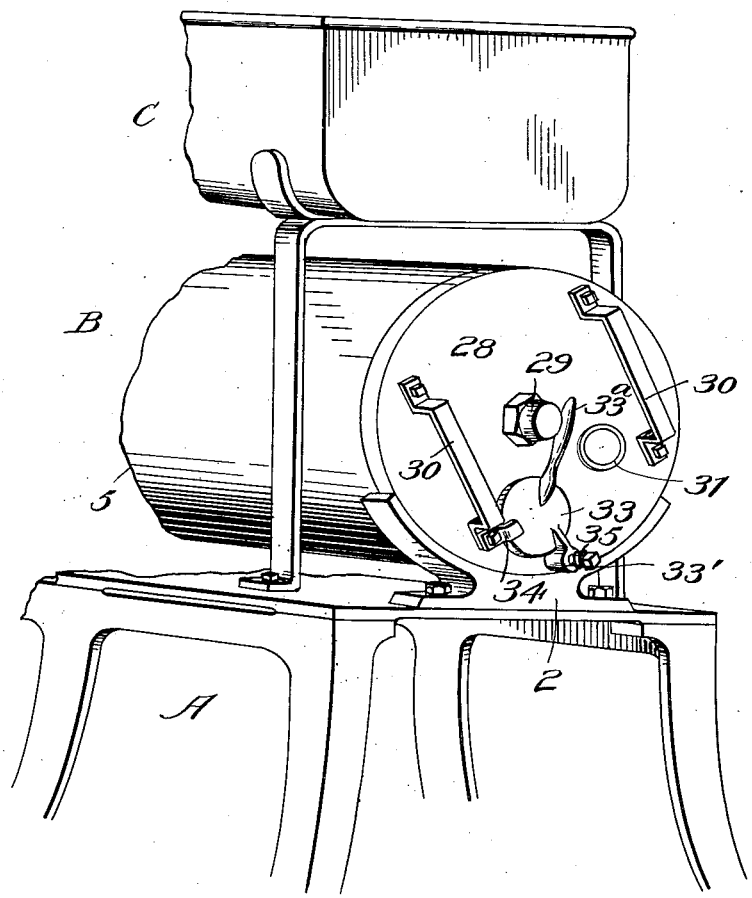
Figure 7:
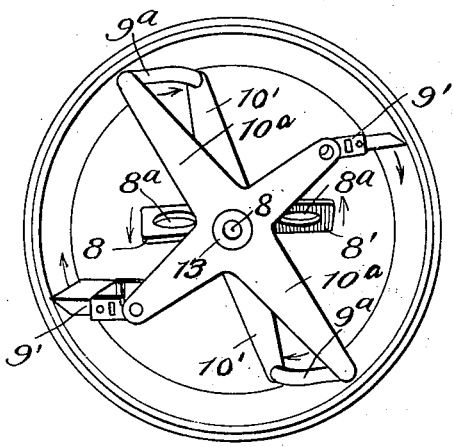
Figure 8:
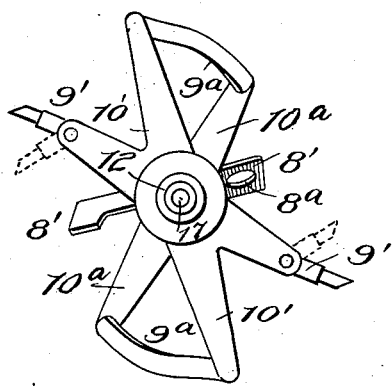
Figure 9:
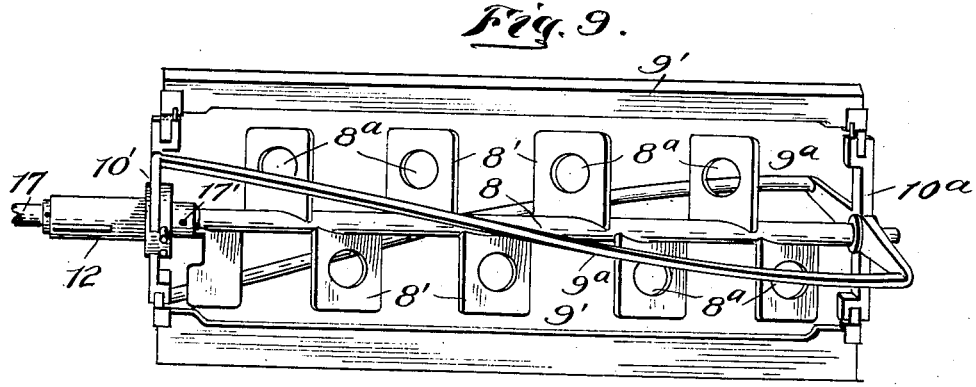
Figure 10:
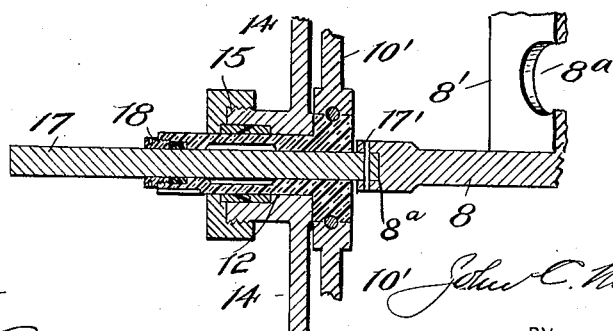

Figure 1 is a perspective view partly in section of a freezing mechanism embodying my improvements. Fig. 2 is a perspective view of a portion of said freezer looking at its delivery end. Fig. 3 is a longitudinal horizontal section through the freezing cylinder. Fig. 4 is a perpsective view of a longitudinal section through the freezing cylinder. Fig. 5 is a section on the line 5, 5 Fig. 3. Fig. 6 is a detail. Fig. 7 is an end view of the cylinder showing a modified form of agitator and advancer. Fig. 8 is an end view of the agitator and advancer detached. Fig. 9 is a side elevation of the same. Fig. 10 is an enlarged sectional view showing the form for mounting the agitating device at the receiving end of the cylinder.

In the drawings A represents as an entirety a platform support or a table for the freezer mechanism, which is indicated as an entirety by B, and also for the receptacle or tank C from which the liquid to be frozen is fed to the freezing cylinder.

1 and 2 are supporting blocks for the horizontally arranged freezer cylinder, these blocks being secured in position upon the table A.

3 indicates the innermost cylinder of the freezer. Preferably this inner cylinder is fitted into a corrugated cylinder 4, the inner walls of which bear against the outer walls of the cylinder 3 in such manner that the corrugations of the cylinder 4 form with the outer walls of the cylinder 3 a spiral passage way 4' for the cooling medium immediately adjacent to and surrounding the freezing compartment for the substance to be treated.

5 indicates the outside cylinder which is fitted over the corrugated cylinder 4 and serves to support and brace the latter cylinder and also to form with the inner cylinder 3 spaces or compartments 5' 5$^a$ at either end of the corrugated cylinder 4 for the introduction of the cooling medium to and its withdrawal from the spiral passage way 4', respectively.

6 indicates a pipe leading into the chamber 5' at the front end of the cooling mechanism and adapted to supply the cooling agent thereto.

7 is a duct or pipe communicating with a chamber 5$^a$ at the opposite end of the freezer mechanism and adapted to conduct the cooling agent from the mechanism.

The agitating means within the freezing cylinder may be constructed in any well known manner. I prefer, however, the construction shown in the drawings in which a compound agitating device is used.

8 indicates a longitudinally arranged shaft having its axis co-incident with the axis of the cylinder 3. 8' are stirring blades or fingers arranged about the periphery of the said shaft. Preferably these blades are arranged in spiral conformation upon the shaft 8, they being sections or portions of a helix or helices formed about the axis of the said shaft and arranged so as to feed the material within the cylinder toward the receiving end thereof at the same time that they are beating or agitating it.

9 indicates a beater and scraper arranged to operate in circles outside of the circles of operation of the blades 8'; this scraper and stirrer 9 comprises the longitudinally arranged pivotally mounted scraping bar 9' situated on one side of the axis of the cylinder and adapted to operate close to the inner wall thereof and the longitudinally arranged spirally twisted stirring and material advancing bar 9$^a$ arranged at the opposite side of the cylinder, these bars being connected together by the arm pieces 10 and 11 arranged at the receiving and delivery ends of the freezing cylinder respectively; the arms 10, 10 are preferably formed integral with a tubular journal 12 which extends out through the receiving end of the freezing cylinder and the arms 11, 11 are preferably formed integral with a hub or bearing 13 which is fitted loosely upon the end of the shaft 8 at the delivery end of the cylinder.

14 indicates the freezer head for the front or material receiving end of the freezing mechanism. It has the annular rib 14' fitted between the near and outer walls of the cylinders 5 and 3 respectively and secured rigidly to the said cylinders. The journal 12 of the beater and scraper 9 extends through the aperture 14ª in the said head.

15 is a stuffing box for the journal 12. This journal is keyed to a bevel gear 16 through which power is transmitted for driving the stirrer scraping and material advancing scraping device 9.

17 is a shaft extending through the hollow journal 12 and having its axis arranged in alinement with the axis of shaft 8, this shaft 17 is fitted into a socket 8ᵇ in the front end of said shaft 8.

17' is a pin for securing the shafts 8 and 17 together.

18 is a stuffing box in the tubular journal 12 for maintaining a liquid-tight joint between it and the shaft 17. At its outer end this shaft is mounted in a bearing 19' carried by a standard 19 which is secured to the table A.

20 is a bevel gear keyed to the shaft 17.

The power for operating the agitating devices is applied through a pulley or power wheel 21 which is secured to a shaft 22 mounted in a bearing 23 carried by the standard 19. At its inner end this shaft 22 has keyed to it a bevel pinion 24 which at either side meshes with one of the bevel gears 16 and 20 respectively. This will cause the rotation of the blades 8' and the stirring and scraping device 9 in opposite directions so as to effect a thorough mixing of the substance to be frozen within the freezing cylinder 3.

25 is a funnel secured to the head 14 of the freezer mechanism and communicating through a port in the head 14 with the interior of the freezing cylinder.

25ª is the cover fitted over the mouth of the funnel and pivotally mounted in position as indicated at 25ᵇ. 25ᶜ is a spring normally tending to press the said cap downward.

26 is a faucet fitted into the receptacle C and having its nozzle arranged to direct the flow of liquid from the said reservoir into the mouth of the funnel 25. 26' is a valve for the said nozzle.

27 indicates an annular plate having an inwardly projecting rib 27' fitted between the ends of the cylinders 3 and 5 at the delivery end of the mechanism. This annular plate carries the screw-threaded rib or flange 27ª to which is detachably fitted the cylinder head 28 for the delivery end of the freezer mechanism.

29 is a removable bearing block fitted into the head 28 and adapted to receive the rear end of the shaft 8.

30 are handles secured to the outer wall of the head 28 and adapted for the purpose of applying pressure for removing the head and also for handling it when removed. 31 is a peep-hole in the said head fitted with a lens adapted to enable the operator to see the condition of the material within the freezing cylinder.

32 is a passage way or duct leading through the head 28 and arranged so as to be adjacent to the inner wall of the freezing cylinder near the bottom thereof when the head 28 is in place, this passageway serving as the discharge passage for the frozen substance from the freezing cylinder. 33 is a cover or valve plate for the outer opening of said passage way, it being pivoted at 33' to the head 28 and having the handle 33ª by means of which it may be readily swung so as to open or close the passage way through the head.

34 is a clip secured to the head 28 and adapted to receive the valve plate 32 when it is swung to its closed position.

35 is a spring associated with the valve plate 33 and adapted to normally press it against the outer end walls of the passage way 32.

In Figs. 7, 8, 9, 10, I have shown a modified form of agitating and material advancing device. It comprises the same idea of an outer rotary spiral feeder and material advancing device and an inner rotary beater having its blades arranged so as to operate on the material and while beating it to advance it within the cylinder in the direction opposite to which the outer blades do. In this construction the blades 8' are preferably arranged as shown, alternately at opposite sides of the said shaft 8, each blade being a section of a helix formed about the axis of the said shaft and arranged to advance the material toward the receiving end of the cylinder. 8ª are holes through the said blades 8' adapted to admit a portion of the material engaged by the said blades to pass through them when the shaft 8 is in operation. This modified form of agitator and advancer is preferably provided at one end with a spider 10' secured to a tubular journal 12 and at the other end with a spider 10ª loosely mounted on the shaft 8. The arms of these spiders are so positioned on the shaft 8 relative to each other that the pivotally mounted scrapers 9' at either end of the device are held with their operative edges, each in a single vertical plane, while the agitator and advancer bars 9ª, one of which is carried at either side of the agitating device, are spirally twisted so as to serve both as agitating bars and as means for advancing the material within the cylinder toward the delivery end thereof.

The operation of the mechanism hereinbefore described is as follows: The mixture to be frozen is placed in the receptacle C, power is applied to the driving wheel 21 and the cooling agent is allowed to enter the freezing mechanism through the duct 6. Any of the cooling agents now known for reducing the temperature of substances to be cooled may be employed. Upon its introduction to the chamber 5' the cooling agent will at once be circulated through the spirally arranged passage way 4' adjacent to the freezing cylinder, causing a substantially uniform reduction of the temperature within said freezing cylinder from one end to the other thereof. The cooling medium after leaving the spiral passage way is conducted from the chamber 5ª by the duct 7. A quantity of the mixture to be frozen is allowed to enter the freezing cylinder through the funnel 25, the spring-held cap 25ª thereof being turned to admit the mixture from the nozzle of the faucet 26. The cap 25ª is then swung back into position closing the mouth of the funnel. The stirring agitating and scraping devices within the freezing cylinder act in conjunction with the cooling medium in the spiral arranged passage way on the outside of the cylinder to effect a uniform freezing of the substance within the cylinder and the spiral bar 9ª tends to feed the frozen material toward the delivery end of the cylinder and to force it through the passage way 32 when the valve plate or door 33 is open, and the spirally arranged blades 8' on the shaft 8 tend to force the material toward the receiving end of the cylinder, the opposite action of the two sets of beating and agitating devices upon the material effecting a thorough beating and agitating thereof, which has the effect of whipping the cream so as to increase the volume of the mixture within the cylinder to a very considerable extent and to give a very fine quality to it when it is frozen.

I have found it desirable to have the blades 8' of the inner-agitator advancer formed with the apertures 8ª therein in order to effect a more thorough beating and whipping of the material than is possible with the solid blades.

When desired it is possible to operate the mechanism herein shown so as to deliver the frozen substance from the freezing cylinder in substantially a continuous stream, and by properly regulating the continuous feed of material to the cylinder and so adjusting the discharge valve as to permit a given quantity of proper material to flow therefrom, that it is also possible to subject the material within the freezing cylinder to any amount of beating desired before permitting it to escape therefrom.

What I claim is:

1. In a machine for freezing liquids, the combination with a freezing cylinder of an agitating device arranged therein and comprising two oppositely rotatable parts, an inner and outer one, the inner part having material engaging blades angularly disposed relative to the axis of the said cylinder to move material engaged by them toward one end of the cylinder when they are rotated in one direction, and the outer part having a material engaging and advancing blade angularly disposed relative to the axis of the said cylinder to move material toward the other end of said cylinder when rotated in the direction opposite to the direction of rotation of the said inner part, and means for rotating the parts of said agitating device in opposite directions.

2. In a machine for freezing liquids, the combination of a freezing cylinder having a discharge opening at the bottom of one end thereof, an agitating device arranged within said cylinder and comprising a spirally twisted longitudinally disposed blade arranged to operate at all times closely adjacent to the inner wall of the cylinder, extending continuously from one end to the other thereof and adapted to move the material within the cylinder longitudinally toward the discharge end thereof as well as about the axis of the cylinder, and blades adapted to move the material within the cylinder longitudinally thereof and away from its discharge end as well as about the axis of the cylinder, and means for actuating said agitating device.

3. In a machine for freezing liquids, the combination with a freezing cylinder having a discharge opening at the bottom of one end thereof, of an agitating device arranged within said cylinder and comprising inner and outer parts, the outer part being of spiral conformation, extending continuously from one end to the other thereof, arranged to operate at all times closely adjacent to the inner wall of the cylinder and adapted to move material toward the discharge end of said cylinder and feed it through said discharge opening, and the inner part being of spiral conformation and adapted to move material in the opposite direction to that in which the said outer part tends to move it as well as about the axis of the cylinder, and means for actuating said agitating device.

4. In a machine for freezing liquids, the combination with a freezing cylinder having a discharge opening at the bottom of one end thereof, of an agitating device arranged within said cylinder and comprising inner and outer oppositely rotatable parts, the outer part being of spiral conformation, extending continuously from one end to the other thereof, and adapted to move material toward the discharge end of said cylinder and feed it through said discharge opening, and the inner part being of spiral conformation and adapted to move material in the opposite direction to that in which the said outer part tends to move it as well as about the axis of the cylinder, and means for rotating the parts of said agitating device in opposite directions.

5. In a machine for freezing liquids, the combination with a freezing cylinder, of an agitating device in said cylinder comprising inner and outer oppositely rotatable parts, the inner part having a series of spirally arranged blades adapted to force material toward one end of said cylinder, and the outer part having a spirally arranged blade adapted to advance material toward the other end of said cylinder, and means for rotating the parts of said agitating device in opposite directions.

6. In an ice cream freezer, the combination of a freezing cylinder having a discharge opening at the bottom of one end thereof, a gate for closing said discharge opening, an agitating device arranged within said cylinder and comprising a spirally twisted longitudinally disposed beater blade arranged to operate at all times closely adjacent to the inner wall of the cylinder and to advance material toward and feed it through said discharge opening, and a longitudinal series of radially disposed beater blades arranged near the center of the cylinder and adapted to force material in the opposite direction to that in which it is advanced by said outer beater blade, and means for actuating said agitating device.

7. In an ice cream freezer, the combination of a freezing cylinder with suitable heads at either end thereof, one of said heads having a discharge opening near its bottom adjacent to the inner wall of the freezing cylinder, agitating, ejecting and scraping mechanism arranged within said cylinder and a plurality of radially disposed arms arranged adjacent to one head of said cylinder, a plurality of radially disposed arms arranged adjacent to the other head of said cylinder, a longitudinally arranged scraper blade connected at either end to one of said radial arms, and a spirally twisted beater and ejector blade secured at either end to one of the remaining radial arms, arranged to operate at all times in close proximity to the inner wall of said freezing cylinder and to move material toward the said discharge opening, and means for actuating said agitating, ejecting and scraping mechanism.

8. In an ice cream freezer, the combination of a stationary freezing cylinder with suitable heads at either end thereof, one of said heads having a discharge opening adjacent to the inner wall of the freezing cylinder, agitating, ejecting and scraping mechanism arranged within said cylinder and comprising an axially disposed shaft, four arms extending radially from one end of said shaft, four arms extending radially from the other end of said shaft, two scraper blades, each connected at either end to the adjacent free end of one of said radial arms, and two spirally twisted longitudinally disposed beater and ejector blades, each secured at either end to the adjacent free end of one of the remaining radial arms, arranged to operate at all times in close proximity to the inner wall of said freezing cylinder and to move material toward the said discharge opening, and means for actuating said agitating, ejecting and scraping mechanism.

9. In an ice cream freezer, the combination of a freezing cylinder having a discharge opening at one end thereof adjacent to the inner wall of the cylinder, a beating and scraping device arranged within said cylinder and comprising an axially disposed shaft, a pair of arms extending radially from one end of said shaft, a pair of arms extending radially from the other end of said shaft, a longitudinally arranged scraper connected at either end to one of said radial arms, a spirally twisted longitudinally disposed beater blade secured at either end to one of the remaining radial arms and arranged to operate in close proximity to the inner wall of said freezing cylinder and to advance material toward the discharge end thereof, and a series of beater blades carried by said shaft and adapted to force material in the opposite direction to that in which the outer blade advances it, and means for actuating said agitating and scraping device.

10. In an ice cream freezer, the combination of a freezing cylinder having a discharge opening at the bottom of one end thereof, an adjustable valve for said discharge opening, means for conducting the cooling medium in a circuitous path around said freezing cylinder, an agitating and scraping device arranged within said cylinder comprising a spirally twisted longitudinally disposed beater and ejector blade arranged to operate at all times closely adjacent to the inner wall of said cylinder and to move material toward and feed it through said discharge opening, a series of radially disposed beater blades arranged at the center of said cylinder and separated at their free ends from said outer beater blade, and a scraping blade arranged to scrape material from the said inner wall of the cylinder, and means for actuating said agitating and scraping device.

11. In an ice cream freezer, the combination of a stationary freezing cylinder having a discharge opening at the bottom of one end thereof, an adjustable valve for said discharge opening, a material agitating and propelling device arranged within said freezing cylinder, comprising a spirally twisted longitudinally disposed beater and ejector blade arranged to operate at all times closely adjacent to the inner wall of said cylinder and to move the material toward and to feed it through said discharge opening, a series of radially disposed beater blades arranged at the center of said cylinder and separated at their free ends from said outer beater and ejector blades, and a scraping blade arranged to scrape material from the inner wall of said cylinder, and means for rotating said ejector and scraper blades in one direction and said radially disposed blades in the opposite direction.

12. In an ice cream freezer, the combination of a freezing cylinder having a fixed head at one end and a detachable head at the other end, one of said heads having a material discharge opening therethrough adjacent to the inner cylinder wall, an adjustable valve for said material discharge opening, cooling medium circulating coils surrounding said freezing cylinder, a hollow shaft extending through said fixed head into the interior of said cylinder, an agitating device carried by said hollow shaft, a second shaft extending loosely through said hollow shaft, a bearing in said detachable cylinder head for one end of said second shaft, an agitating mechanism carried by said second shaft and gearing for rotating in opposite directions said shafts and the agitating devices carried thereby, respectively.

13. In an ice cream freezer, the combination with a cylinder provided with a feed duct and a discharge opening and having a chamber at the periphery for the refrigerating fluid and a central chamber for the material to be refrigerated, of a material-agitating and propelling device comprising a series of relatively short spirally-arranged blades adapted to propel the central part of the body of material away from the said discharge opening and an outer material engaging and agitating device adapted to maintain at all times when in operation a substantially continuous propelling action on the material at points adjacent to the cylinder wall in the direction of the said discharge opening, and means for actuating said agitating and propelling device.

14. In an ice cream freezer, the combination with a freezing cylinder having a material discharge opening at the bottom of one end thereof and a suitable material inlet, of means for circulating the cooling medium in a circuitous path around said freezing cylinder, a material-agitating and propelling device arranged within said cylinder and comprising a series of relatively short radially disposed blades adapted to agitate and propel the central part of the body of material within said cylinder away from the said discharge opening, and an outer blade arranged closely adjacent to the inner wall of the cylinder extending continuously from end to end thereof and adapted to move the material at points adjacent to said cylinder wall in the direction of said discharge opening and to feed it therethrough, a valve for opening and closing said discharge opening, and means for rotating the inner and outer parts of said agitating and propelling device in opposite directions.

15. In an ice cream freezer, the combination of a freezing cylinder having a fixed head at one end and a detachable head at the other end, one of said heads having a material-discharge opening therethrough adjacent to the inner wall of said cylinder, an adjustable valve for said material discharge opening, cooling medium circulating coils surrounding said freezing cylinder, a material agitating and propelling device arranged within said cylinder and comprising a series of relatively short radially disposed blades adapted to agitate the central part of the body of material within said cylinder and an outer longitudinally disposed spirally twisted beater and ejector blade arranged to operate at all times closely adjacent to the inner wall of said cylinder, extending from end to end thereof and arranged to maintain a substantially continuous propelling action on the material at points adjacent to the cylinder wall in the direction of said discharge opening, and means for rotating the inner and outer parts of said agitating and propelling device in opposite directions.

16. In an ice cream freezer, the combination of a freezing cylinder having a fixed head at one end and a removable head at the other end, one of said heads having a material-discharge opening therethrough adjacent to the inner wall of the cylinder, an adjustable valve for said material-discharge-opening, a hollow shaft passing through said fixed head into the interior of said cylinder and rotatably mounted in said head, an agitating device driven by said hollow shaft, a second shaft extending loosely through said hollow shaft, an agitating device detachably connected to said second shaft and having its end adjacent to said removable head revolubly supported by said head, and means for independently rotating the two shafts.

17. The combination with a freezer can, of a scraper knife therein, a cream-rubbing and propelling bar having a rounded edge and arranged spirally with relation to the axis of the can, to operate closely adjacent to the inner wall of the can and extending continuously from end to end thereof, and means for rotatably supporting said scraper knife and rounded bar within said cylinder.

18. In an ice cream freezer, a can, spiders revoluble therein, scraping knives carried on the outer ends of corresponding arms on diametrically opposite sides of the spiders, rounded bars carried on alternate arms of the spiders and spirally arranged with relation to the axis of the spiders and shaped for their length to fit to the periphery of the can and acting to wipe the can and press the cream therein toward one end.

19. A machine for freezing liquids, having a freezing cylinder with heads at opposite ends thereof, one of said heads provided in its lower portion with a valved discharge opening, one of said heads provided in its upper portion with an opening communicating with the interior of the freezing cylinder and having an external funnel or hopper, and material agitating and ejecting mechanism in said cylinder.

20. In a machine for freezing liquids, the combination of a horizontally disposed freezing cylinder having heads at opposite ends thereof, one of said heads provided in its lower portion with a valved discharge opening, one of said heads provided in its upper portion with an opening communicating with the interior of the freezing cylinder and having an external funnel or hopper, material agitating and ejecting mechanism arranged within said cylinder, and means for operating said material agitating and ejecting mechanism.

21. The combination, with a freezer can having a discharge opening at one end, of a shaft therein, beater blades secured to said shaft and obliquely inclined thereto, spiders loosely mounted upon said shaft, means for rotating said shaft and spiders in opposite directions, scraper knives pivoted on diametrically opposite arms of said spiders and adapted to bear against the inner face of the can, spirally arranged bars carried on the other arms of said spiders and traveling in the path of the scraper knives to force the material as scraped from the can toward said discharge opening.

In testimony whereof I affix my signature in presence of two witnesses.

JOHN C. MILLER.

Witnesses:
HOMER GIESSEN,
FRANK TYSON.